(12) United States Patent
Lukins

(10) Patent No.: US 6,247,513 B1
(45) Date of Patent: Jun. 19, 2001

(54) PRESSURE INDICATING TIRE INFLATION VALVE

(75) Inventor: Warwick Edward Lukins, West Pymble (AU)

(73) Assignee: J.C. Ludowici & Son Ltd., New South Wales (AU)

( * ) Notice: Subject to any disclaimer, the term of this patent is extended or adjusted under 35 U.S.C. 154(b) by 0 days.

(21) Appl. No.: 08/612,970

(22) PCT Filed: Aug. 23, 1994

(86) PCT No.: PCT/AU94/00491

§ 371 Date: Dec. 9, 1996

§ 102(e) Date: Dec. 9, 1996

(87) PCT Pub. No.: WO95/10425

PCT Pub. Date: Apr. 20, 1995

(30) Foreign Application Priority Data

Oct. 8, 1993 (AU) .................................................. PM1706

(51) Int. Cl.[7] .................................................. B60C 23/02
(52) U.S. Cl. .......................... 152/427; 152/429; 137/227; 116/34 R
(58) Field of Search ..................................... 152/427, 429; 116/34 R, 34 A, 34 B; 73/146.2, 146.3, 146.8; 137/227

(56) References Cited

U.S. PATENT DOCUMENTS

| | | | |
|---|---|---|---|
| 2,618,977 | * 11/1952 | Hottenroth | 116/34 R |
| 3,451,418 | * 6/1969 | Nakagawa et al. | 137/227 |
| 4,991,618 | * 2/1991 | Gould | 152/427 X |

FOREIGN PATENT DOCUMENTS

1360971 * 4/1964 (FR) ..................................... 137/227

* cited by examiner

*Primary Examiner*—Russell D. Stormer
(74) *Attorney, Agent, or Firm*—James Ray & Associates

(57) ABSTRACT

A tire inflation valve stem comprises a stationary, radially outer stem part (3); a movable, radially inner stem part (4) slidable axially within the outer part; a compression reaction spring (20) extending between the core parts; and a flexible barrier (23) extending from one core part to the other to prevent air leakage between the parts. The flexible barrier comprises a thin walled, soft elastomeric tube sealed at its ends to the respective core parts and with an intermediate part curved back on itself in a free rolling manner within a variable length annular space between an external cylindrical surface (19) of the movable core part and an internal cylindrical surface (12) of the stationary part.

11 Claims, 3 Drawing Sheets

PRESSURE INDICATING TIRE INFLATION VALVE

TECHNICAL FIELD

This invention relates to valves for the inflation of pneumatic tires for motor vehicles and other wheeled equipment, and more particularly, to valves of that kind with the ability to indicate a loss of air pressure from within the tire.

BACKGROUND ART

Conventional tire inflation valves comprise a tubular valve stem that is internally threaded at one end to receive a valve core. In use, the valve stem extends through a so called valve aperture in the wheel rim and provides an inflation passage for the admission of air to the interior of the tire. In the case of tubeless tires the stem is sealed to the wheel rim about that aperture. If the valve is a so called "snap-in" valve, the seal is effected by virtue of the tight fit within the valve aperture of a basal component of the stem, usually an elastomeric collar encircling and bonded to the stem. If the valve is a so called "clamp-in" valve, the seal is effected by means of annular clamping means including a ring nut and sealing washers or the like encircling the stem and securing it to the rim. In the case of tubed tires the valve stem is bonded to, or in some instances clamped to, the tube wall to provide an inflation passage therethrough.

In all instances, the valve core comprises a valve body incorporating a seat and a spring-loaded valve element co-acting with that seat, and constitutes a non-return valve controlling air flow through the inflation passage. The valve core is a replaceable item and it and the part of the valve stem that receives it have become standardised throughout the world insofar as their cross-sectional dimensions are concerned.

It is well known that tire life and vehicle safety depend largely on tires being maintained at the recommended inflation pressure, which varies with the vehicle-tire combination, tire location on the vehicle and operating conditions. It is also a fact of life that many persons omit to check tire pressures regularly, and indeed frequently are not certain as to what is the correct pressure in a particular instance.

Thus a number of devices have been proposed hitherto for providing a continuous indication of the correctness or otherwise of the pressure in a tire; so as to remove the need for deliberate actions on the part of the motorist, after the initial inflation to the correct pressure, to check the existing pressure and the need for the motorist to remember or determine the correct value.

Such prior known devices have included indicators adapted to be secured to the free or exposed end of a conventional valve stem in lieu of a conventional dust cap thereon. Such self contained, auxiliary indicators necessarily hold the core's valve element off its seat to enable the tire pressure to reach and act on the indicator. Unfortunately such indicators have proved to be unreliable in maintaining a seal between themselves and the valve stem. Thus they frequently allow air to leak from the tire, and have not found wide spread acceptance.

As a better alternative, various indicating valves have been proposed incorporating means within the valve stem to enable the valve itself to provide an indication of the inflation pressure. Typically such indicating valves have comprised a two part stem, namely an outer stationary part and an inner movable part telescopically slidable relative to the stationary part, sealing means to prevent leakage from between the two parts and yieldable reaction means counteracting the tire pressure acting upon the movable part. Thus the rest position of the movable part of the stem depends on the tire pressure, and the design is such that departure from a rest position corresponding to the correct pressure is made manifest to an observer.

One class of prior known indicating valves have utilized sliding sealing means wherein a seal makes sliding contact with one or other of the parts of the stem. It has been found however that sliding seals are a cause of leakage. Furthermore they cause inaccuracy in operation due to wide variation in the frictional restraint imposed by the seal upon the movable part of the stem, due, inter alia, to deterioration in the condition of the contacting sealing surfaces as a result of aging, contamination or corrosion.

To overcome the inherent difficulties with sliding seals it has also been proposed to use non-sliding sealing means comprising a flexible barrier, sealed to each stem part and extending from one to the other to maintain a seal therebetween while allowing the moving part to move.

Prior art proposals exemplifying pressure indicating inflation valves utilising a reaction spring to determine the rest position of a movable stem part in combination with flexible barrier type sealing means are illustrated by the specifications of U.S. Pat. Nos. 3,230,968 (Struby) and 3,811,459 (Schmidt), while an example of a valve wherein all of the reaction force is supplied by similar, but resilient, sealing means is that of U.S. Pat. No. 5,027,848 (van Leeuwen).

From those specifications it will be seen that prior known flexible barrier seals fall into two classes, namely axially extending, concertina type tubes or boots enclosing the reaction spring (for example, Struby's FIGS. 1 to 4 embodiment), and more or less radially extending diaphragms (for example, Schmidt's preferred embodiments and Struby's FIGS. 5 and 6 embodiment).

DISCLOSURE OF INVENTION

The present invention is concerned with pressure indicating inflation valves of the kind having a telescopic stem, a reaction spring, and a flexible barrier to prevent leakage from between the relatively movable parts of the stem. Thus the invention avoids the deficiencies indicated earlier in respect of auxiliary, valve mounted indicators and indicating valves proper with internal sliding seals.

The prime desiderata of inflation indicator valves are:
1. Accuracy of indication,
2. Sensitivity to pressure changes, that is to say there should be an appreciable movement of the movable stem part in response to small changes in tire pressure,
3. Stability, so that resetting is not needed after an original setting is made, and
4. Reliability, in that the valve should not introduce any appreciable reduction in the service capacity, life and safety of operation of the tire.

Valves including prior known flexible barriers all fail in some respect to meet one or other of those desiderata.

Thus, contrary to the idealized illustrations in the Struby specification, concertina tube type barriers enclosing the reaction spring which have walls that are flexible enough to not inhibit desideratum 2 are forced by the pressure difference across them to obtrude into the spaces between the turns of the spring and become pinched therebetween. This grossly detracts from desideratum 1 and is deleterious insofar as desideratum 4 is concerned.

Radial type diaphragms that are thick enough and strong enough to meet desideratum 4, for example those of Schmidt's valves or that of Struby's FIGS. 9 and 10 embodiment, either seriously detract from desideratum 2 (in that they limit the extent to which the movable part may travel), or detract from desiderata 1 and 3 (in that they contribute appreciably to the reaction force and do so, with known elastomers, to an extent that varies with aging of the diaphragm), or both.

If a diaphragm is made sufficiently oversize or loose and sufficiently thin (as in Struby's FIGS. 5 and 6 embodiment) to meet desideratum 2, then, again contrary to the idealised drawing, it is likely at times to be partially collapsed upon itself or ballooned up and caused to obtrude between the spring turns. This introduces variable frictional resistances between contacting parts of the diaphragm to its extension and contraction, or positive restraints on the spring's response to pressure changes respectively, thereby detracting from desideratum 1. Moreover the large annular area of a thin and flexible diaphragm of this kind that is subjected to a pressure difference produces a correspondingly high rupturing stress in the periphery of the diaphragm, detracting from desideratum 4.

Thus an object of the present invention is to provide an inflation valve that meets all of the desiderata mentioned above. The invention meets that object by providing a valve wherein the flexible barrier has only a limited unsupported area exposed to a pressure difference, introduces no design limits on the travel available to the reaction spring in response to pressure variations, has otherwise no substantial effect on the spring response and is shielded from contact with the spring.

The invention consists in a tire inflation valve stem of the kind comprising a stationary, radially outer stem part; a movable, radially inner stem part slidable axially within the outer part; a reaction spring extending from one said part to the other; and a flexible barrier extending from one said part to the other to prevent air leakage between the parts; characterised in that said movable part defines an external cylindrical surface, in that said stationary part defines an internal cylindrical surface co-axial with said external cylindrical surface, in that said external cylindrical surface is smaller in diameter than said internal cylindrical surface and protrudes through an open end of the internal cylindrical surface to define therewith a variable length annular space between the cylindrical surfaces, and in that said barrier comprises a flexible tube having an end portion sealed to the stationary part, another end portion sealed to the movable part, and an intermediate portion, a variable length of which is curved back upon itself and disposed within said annular space.

In preferred embodiments the internal cylindrical surface is the radially inner surface of a skirt extending coaxially from that end of the stationary core part which, in use, is within the tire (referred to as "the inner end" hereinafter), whereas the external cylindrical surface is the radially outer surface of the curved wall of a cup having a floor pierced by or secured to the movable core part at or near the latter's inner end, so that the cup wall is coaxial with and encircles the movable core part. In this instance the reaction spring is a compression spring, and one end of the spring is seated within that cup and the wall of the cup shields the spring from the intermediate portion of the barrier tube. This provides an axially compact construction while maintaining the separation of the spring and the flexible barrier.

DESCRIPTION OF THE PREFERRED EMBODIMENT

Figure 1:
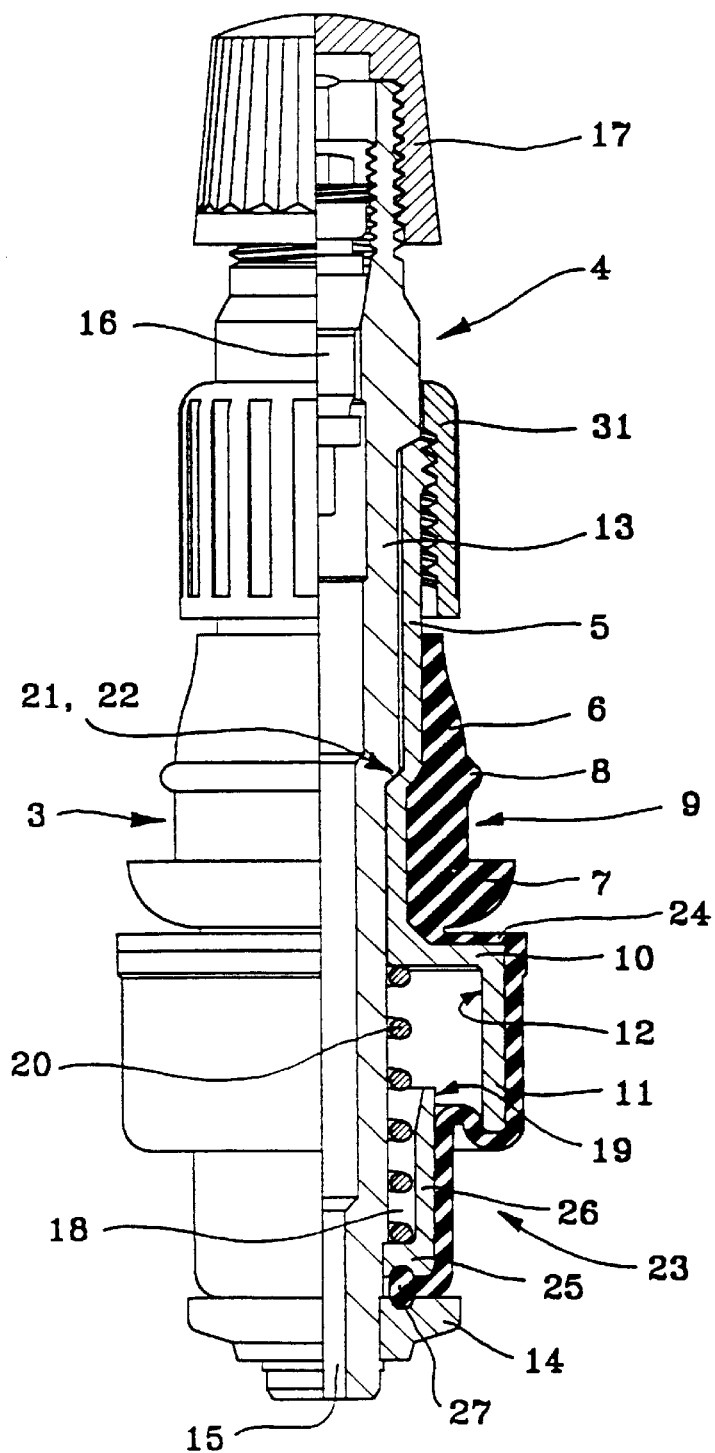
FIG. 1 is a quarter-sectioned side elevation of a tire valve incorporating a valve stem according to the invention, drawn to an enlarged scale and showing the stem as it would be in an un-inflated tire.

The illustrated valve is of the "snap-in" type for use in conjunction with a tubeless tire.

It comprises a stationary core part 3 and a movable core part 4 that may slide axially within the stationary part 3.

The stationary core part 3 comprises a rigid, preferably metal, mounting tube 5 and a moulded elastomeric, basal collar 6 surrounding the tube 5. The collar 6 may be merely a neat fit upon the tube 5, but preferably is adhered or otherwise bonded thereto. It is furnished with a sealing flange 7 and bead 8 bounding a sealing surface 9 adapted to fit tightly within a valve aperture in a wheel rim, whereby the valve as a whole is secured to the rim in an airtight manner. Insofar as it is described above the basal collar 6 is conventional and needs no further description.

In accordance with this embodiment of the invention, the stationary core part 3 further comprises a circumferential, inner end flange 10 on the mounting tube 5 and a cylindrical skirt 11 defining a stationary internal cylindrical surface 12.

The movable core part 4 comprises a rigid, preferably plastics, tubular core holder 13 with an inner end abutment collar 14 adhered, ultra-sonically welded or otherwise fixed in an air-tight manner to the core holder 13. The core holder 13 is a free sliding fit within the mounting tube 5. The fit is such that air may readily bleed from within the confines of the skirt 11 to atmosphere and vice versa.

The movable stem part 4 further comprises a cup 18 comprising a floor 25 and a curved wall 26. The cup 18 is pierced by a preformed hole in the floor 25 and the core holder 13 extends through the hole in the floor 25. The curved wall 26 of the cup 18 defines an external cylindrical surface 19 that is coaxial with and spaced from the internal cylindrical surface 12.

An inflation passage 15 extends axially through the holder 13. The holder 13 is machined at the outer end of that passage to take and seal with a standard, screw-in valve core 16 incorporating a non-return valve, whereby the tire may be inflated in well known manner. The holder 13 is externally threaded at its outer end to take a dust cap 17.

Figure 2:
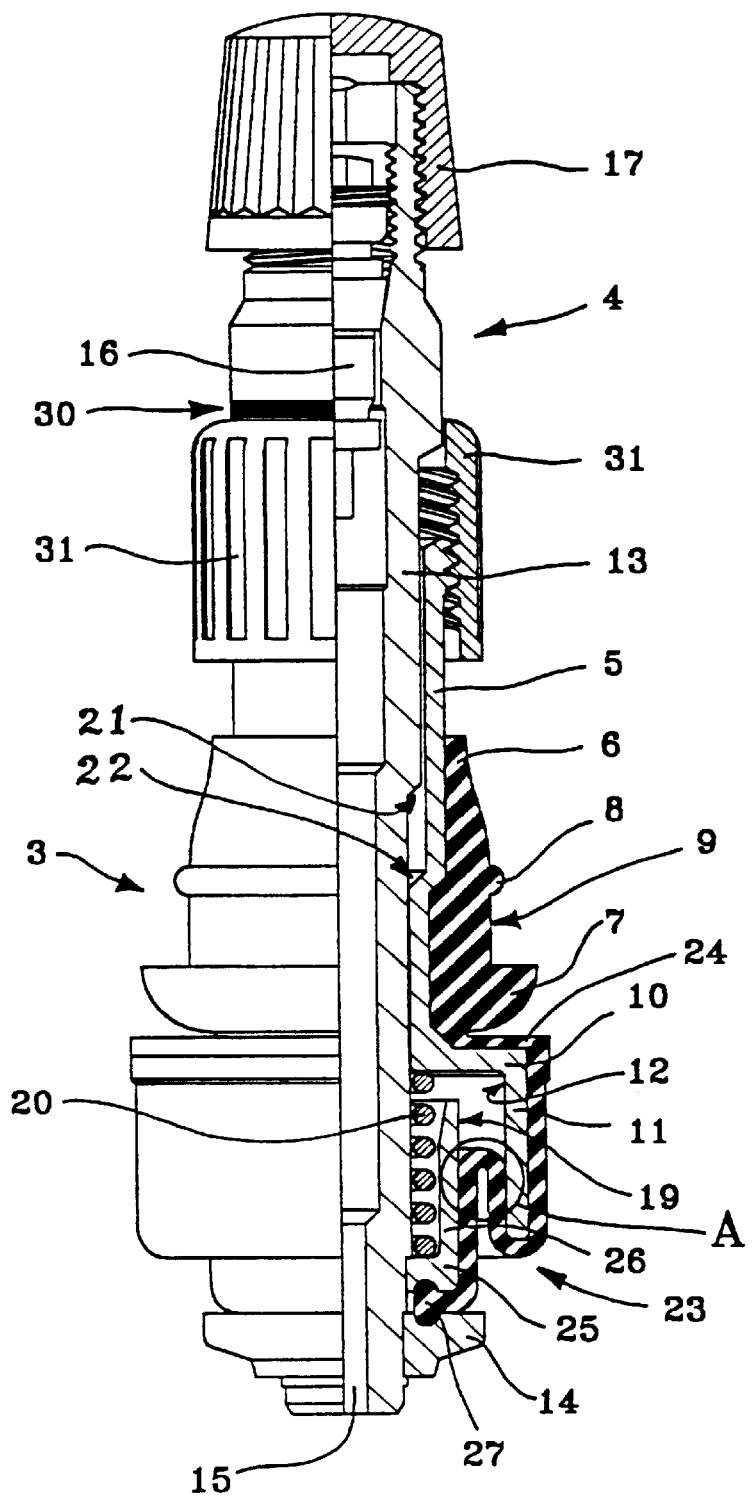
FIG. 2 is a view similar to FIG. 1 of the valve illustrated in FIG. 1, but showing the stem as it would be in an inflated tire.

The inflation valve further comprises a coaxially mounted, helical reaction spring 20 sleeved upon the core holder 13 and compressed between the floor 25 of the cup 18 and the flange 10. The spring 20 is always compressed to some extent, being unable to shift the core holder 13 inwardly further from the mounting tube 5 than is shown in FIG. 1 because of contact between abutment shoulders 21 and 22 on the core holder and mounting tube respectively. As can be seen in FIG. 2 this limit position is such that there is always some overlap in the axial direction between the internal cylindrical surface 12 and the external cylindrical surface 19.

In the embodiment of the invention now being described a flexible, tubular barrier 23 extends from the movable stem part 4 to the stationary part 3. That tubular barrier 23 is preferably moulded integrally with the collar 6 from a "soft" rubber or other elastomer.

The tubular barrier 23 is sealed at its outer end to the stationary stem part 3 by virtue of a connecting web 24 extending integrally between the main tubular body of the barrier 23 and the collar 9. It is secured and sealed to the movable stem part 4 by means of a circumferential bead 27 on the inner end of the tubular body lodged between the cup floor 25 and the abutment washer 14, both of which are grooved to receive the bead 27.

As is clear from FIG. 1, the flexible barrier 23 comprises an outer end part sleeved upon the outer surface of the skirt 11, and an inner end part of lesser diameter sleeved upon the external cylindrical surface 19. In its as moulded configuration the barrier body is preferably shaped as a smooth walled, dual diameter tube with a step at the transition between one diameter and the other. During the assembly of the valve, the stepped portion of the barrier tube is folded back on itself and lodged between the overlapping portions of the internal cylindrical surface 12 and the external cylindrical surface 19, to bring the barrier into the configuration shown in FIG. 1.

Figure 3:
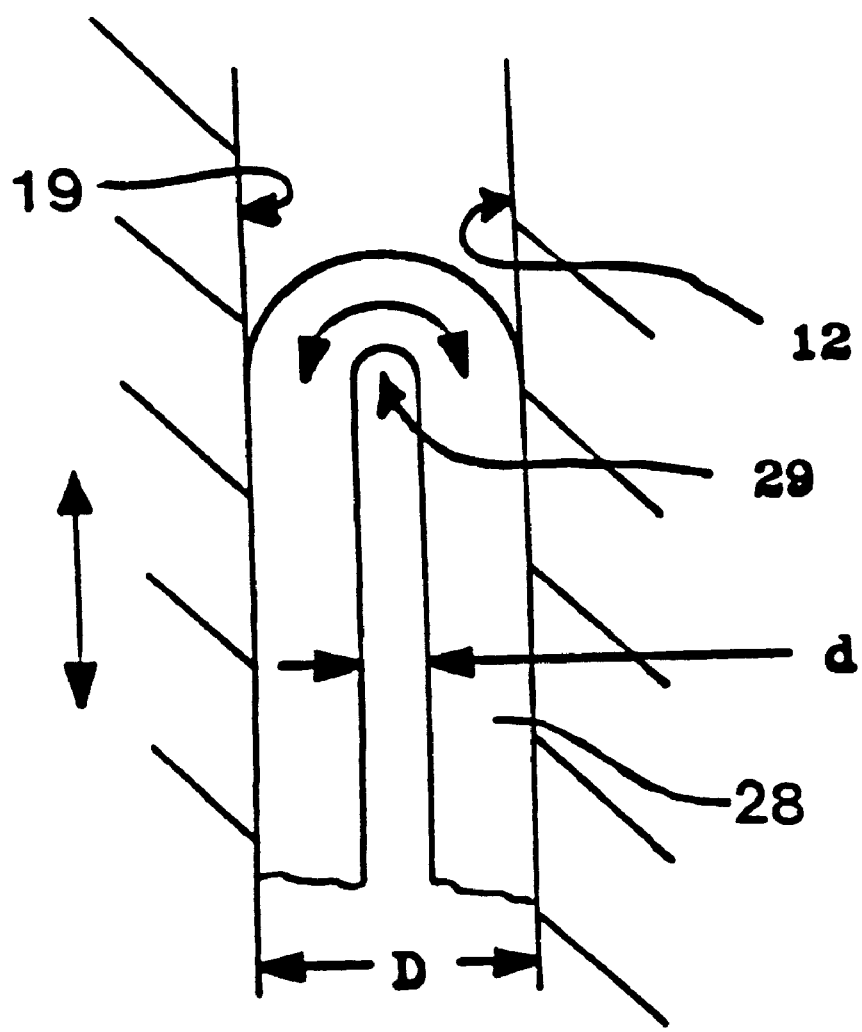
FIG. 3 is an enlarged view of the matter within enclosure A of FIG. 2.

However in other embodiments the barrier body may be moulded as a simple tube of constant diameter, that may be stretched to display an enlarged end portion. In any event a variable length intermediate portion 28 (see FIG. 3) of the barrier 23 is constrained between the cylindrical surfaces 12 and 19. That intermediate portion is maintained with a U shaped cross-section and may be said to roll upon itself as the movable stem part moves under the influence of changes in inflation pressure, as indicated by the arrows in FIG. 3. For preference the distance D between the surfaces 19 and 12 is as small as possible consistent with maintaining a clear separation d between the parts of the intermediate portion of the barrier 23 contacting the surfaces 12 and 19 at any instant. This ensures that the rolling movement is unimpeded by friction between those parts of the barrier while also ensuring that the width of the unsupported annular area 29 of the barrier exposed to a pressure differential is small. For preference, the separation d is less than the tube wall thickness of the barrier, say half that thickness, and no more than two or three times that thickness. In this way the rupturing force applied to the barrier is minimalised, thereby achieving desideratum 4 above, while allowing a soft, thin and therefore very flexible barrier to be used. This and the free rolling, controlled movement of the barrier tube achieves desiderata 1 and 3.

It will also be apparent that there is no change in the rupturing force as a result of movement of the movable stem part, thus there is no inherent limit on the allowable magnitude of that movement. It follows that the lengths of the cylindrical surfaces 12 and 19 and the length of the tubular body of the flexible barrier may be selected as required to accommodate any degree of sensitivity of the reaction spring as may be thought desirable to meet desideratum 2.

The extent to which the movable stem part 4 projects from the stationary part 3 is an indication of the inflation pressure. Thus the correctness of the pressure may be made manifest by appropriate indicia on the protruding portion of the movable part.

In simple embodiments, intended for use in relation to a single predetermined correct inflation pressure, three color coded rings or the like on the core holder, where it protrudes from the stationary core part 3, may indicate whether the tire is under-inflated, correctly inflated (to the nominal pressure concerned) or over-inflated, depending on which ring is level with the outer end of the sleeve. However, for preference, as in the illustrated embodiment, provision is made to enable it to be set for use with any one of a predetermined range of correct pressures. To that end, the mounting tube 5 is furnished with a ring-nut 31 which may be advanced or retracted to provide for adjustment of the effective length of the stationary stem part. The core holder 13 may be marked with a single indicium, for example, a colored ring 30, and following an initial inflation of the tire to its correct pressure, the ring-nut 31 may be positioned so that its rim coincides with the indicium. Thereafter any change in pressure will be indicated by the departure of that indicium from its position of coincidence with the rim of the nut 31.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims. For example, whilst the invention has been described in terms of a snap-in type valve it will be appreciated that it may be used in a clamp-in type valve or incorporated into an inner tube.

What is claimed is:

1. A tire inflation valve stem of the kind comprising a stationary, radially outer stem part; a movable, radially inner stem part slidable axially within the outer part; a reaction spring extending from one said part to the other; and a flexible barrier extending from one said part to the other to prevent air leakage between the parts wherein said movable part defines an external cylindrical surface and said stationary part defines an internal cylindrical surface co-axial with said external cylindrical surface, and wherein said external cylindrical surface is smaller in diameter than said internal cylindrical surface and protrudes through an open end of the internal cylindrical surface to define therewith a variable length annular space between the cylindrical surfaces, and wherein said barrier comprises a flexible tube having an end portion sealed to the stationary part, another end portion sealed to the movable part, and an intermediate portion, a variable length of which is curved back upon itself and disposed within said annular space, and wherein said internal cylindrical surface forms a skirt extending coaxially from an inner end of the stationary core part, being the end which, in use, is within a tire fitted with the valve stem.

2. A valve stem according to claim 1 wherein said external cylindrical surface defines a curved wall of a cup, said cup having a floor pierced by and secured to the movable core part adjacent its inner end such that the cup wall is coaxial with and encircles the movable core part.

3. An inflation valve comprising a valve stem according to claim 2.

4. A valve stem according to claim 2 wherein the reaction spring is a compression spring, and one end of the spring is seated within said cup, and wherein the curved wall of the cup shields the spring from the variable length of the intermediate portion of the tube.

5. An inflation valve comprising a valve stem according to claim 4.

6. A valve stem according to claim 1 wherein said tube is a soft elastomeric tube having a wall thickness, and wherein said annular space has a width that exceeds twice said wall thickness but does not exceed five times said wall thickness.

7. A valve stem according to claim 6 wherein said width of said annular space is substantially equal to 2.5 times said wall thickness.

8. A valve stem according to claim 6 wherein said width of said annular space is substantially equal to twice said wall thickness plus 0.5 mm.

9. A valve stem according to claim 1 wherein said stationary core part is externally threaded and is furnished with a ring nut which may be advanced or retracted to adjust the effective length of said stationary core part.

10. An inflation valve comprising a valve stem according to claim 9.

11. An inflation valve comprising a valve stem according to claim 1.

\* \* \* \* \*